Figure 1:
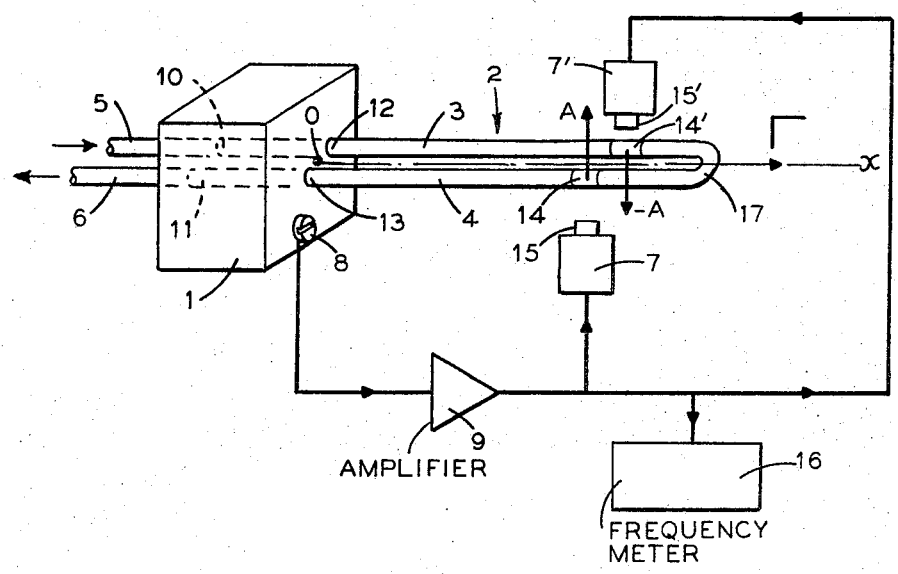

United States Patent [19]
Janssen

[11] 3,728,893
[45] Apr. 24, 1973

[54] DEVICE FOR MEASURING THE DENSITY OF A FLUID

[75] Inventor: Sylvain Janssen, Neuilly, Hauts-de-Seine, France

[73] Assignee: Campagnie Des Compteurs, Paris, France

[22] Filed: Apr. 5, 1971

[21] Appl. No.: 131,016

[30] Foreign Application Priority Data

Apr. 6, 1970   France..........................7012318

[52] U.S. Cl....................................................73/32
[51] Int. Cl..............................................G01n 9/02
[58] Field of Search.......................73/32, 67.1, 67.2, 73/71.4, 71.5, 194 B

[56] References Cited

UNITED STATES PATENTS 2,943,476   7/1960   Bernstein.................................73/32
3,218,851   11/1965   Sipin......................................73/32 X

FOREIGN PATENTS OR APPLICATIONS 1,126,450   9/1968   Great Britain............................73/32
171,651   7/1965   U.S.S.R...................................73/32

Primary Examiner—Jerry W. Myracle
Attorney—William R. Sherman, Stewart F. Moore, Jerry M. Presson, Leonard R. Fellen and Roylance, Abrams, Berdo and Kaul

[57] ABSTRACT

Disclosed device includes a fluid conveying, U-shaped tube having its end portions secured to a base member. Means are provided in the proximity of the U-shaped end portion of the tube for establishing a torsional oscillation of the tube and for measuring the frequency of this oscillation, the frequency being representative of the density of the fluid.

6 Claims, 2 Drawing Figures

PATENTED APR 24 1973          3,728,893

INVENTOR.
Sylvain Janssen
BY
*Leonard R. Feller*
ATTORNEY

DEVICE FOR MEASURING THE DENSITY OF A FLUID

The present invention relates to a device for measuring the density of a fluid in a body in which the fluid flows.

A large number of devices are known for measuring the density of fluids in which the fluid to be measured is contained in vessels in the form of a tube or balloon set into vibratory motion. These vessels then form part of an assembly having a substantially constant coefficient of mechanical stiffness. The frequency of the free oscillations maintained furnishes a measure of the density of the fluid contained in the vessels. As the known devices generally oscillate in a simple harmonic mode and most often in flexure, the variations of frequency resulting from the introduction of the liquid and from the variations in its density are then relatively small in absolute value.

The object of this invention is to provide a fluid density measuring device having an increased absolute variation of the frequency obtained, and consequently an increased sensitivity of the measuring device.

The measuring device, according to the invention, includes a fluid conveying, elongated tubular member having a U-shaped end portion and a pair of leg portions extended therefrom and mounted on a base member. Means are provided for establishing torsional oscillation of the tubular member and for measuring the frequency of this oscillation, the frequency being representative of the density of the fluid.

Preferably the means for establishing the torsional oscillation of the tubular member comprise a vibration sensor fixed to the base and electrically coupled via a sustaining amplifier to a frequency meter and to two drive coils whose axes are perpendicular to the median axis of the tubular member and function to maintain an alternating torsional couple with respect to the median axis of the tubular member.

In addition to an increase in sensitivity, the device according to the invention has the advantage of having a response that is substantially linear in a range of measurement in which the density of the fluid under examination does not take on values that are too high.

Figure 2:
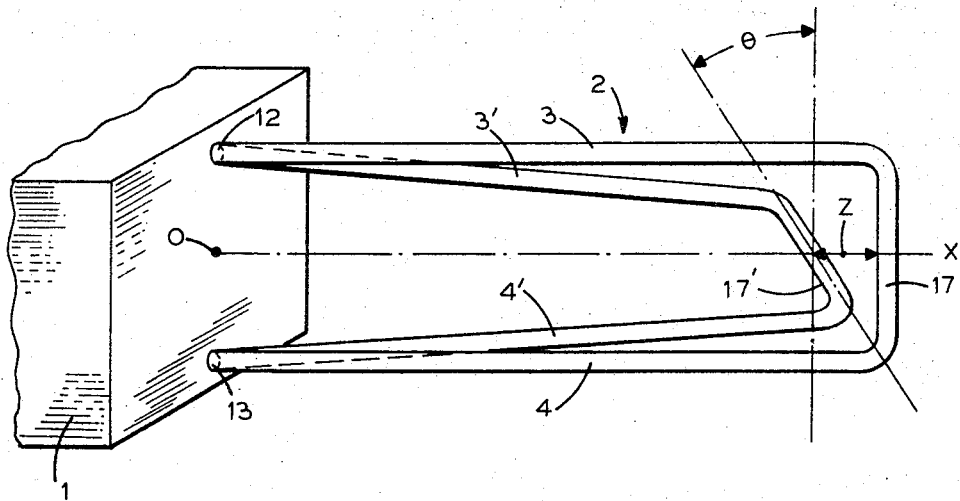

Other objects and advantages of the invention will become apparent from the following description taken in connection with the accompanying drawing in which:

FIG. 1 shows schematically one embodiment of a measuring device in accordance with the present invention; and FIG. 2 shows the deformation of the U-tube of FIG. 1 when submitted to torsional oscillation.

In FIG. 1, the reference numeral 1 designates a solid base member, made of metal for example, and having two parallel cylindrical holes 10 and 11 passing therethrough from one end to the other. An elongated fluid conveying tube 2 having a U-shaped end portion 17 and a pair of extending leg portions or branch members 3 and 4 is rigidly mounted on the base 1 such that the branch portions 3 and 4 pass through respective holes 10 and 11 with the branch ends 5 and 6 respectively providing inlet and outlet ports for a fluid whose density (mass per unit volume) is to be measured while flowing in the tube 2.

In the figures, the X axis designates the median axis of the tube 2, that is, the axis perpendicular to the base at the point 0 located midway between the points 12 and 13 where the tube is embedded in the base, and parallel to the branches 3 and 4.

A vibration sensor 8, as for example, a cell member of piezoelectric or magnetostrictive material is attached to the base 1 and has an output electrically coupled to the input of an amplifier 9. The output of the amplifier 9 is coupled to two drive coils 7, and 7' and to a frequency meter 16. In the example shown, the coils 7 and 7' are disposed on opposite sides of the mid-plane of the U-shaped tube. These coils provide, at the frequency of excitation of the device, opposite forces of attraction and repulsion of a magnitude A on respective branches 4 and 3 of the tube 2, which is assumed to be made of a magnetic material. These forces provide for the maintenance or continuance of torsional oscillations by generating a couple $\Gamma$ with respect to the O–X axis. The result is an alternating rotational motion of the bent end portion 17 of the tube 2, around the axis O–X. The deformation of the system is analogous to that produced in a bi-filar suspension. As is indicated in FIG. 2, the bent or U-shaped end 17 turns through an angle $\theta$ while undergoing a slight pull-back Z in a direction towards the base 1 and is thus shown in the position 17'. The branches 3 and 4 twist and bend in order to occupy the positions 3' and 4' as shown in FIG. 2.

For the described system, and in the absence of any fluid there exists a base frequency or frequency of resonance $F_0$ of the form $$F_0 = \alpha \sqrt{K/I_0} \qquad (1)$$

where $I_0$ designates the moment of inertia of the system with respect to the axis O–X and $K$ is a constant of torsion around this axis.

The sensor 8 picks up the vibrations thus produced, and with the aid of the amplifier 9, a signal is fed to the coils 7 and 7' to produce the couple $\Gamma$ to sustain the vibratory motion of the tube 2. The introduction of the fluid modifies the moment of inertia which then becomes $I = I_0 + \beta\rho$, where $\rho$ designates the density of the fluid and $\beta$ is a constant coefficient.

Assuming that the coefficient of torsion $K$ is practically constant, then under these conditions, the frequency of oscillation of the system becomes;

$$F_1 = \alpha \sqrt{K/I_0 \cdot 1} \sqrt{1 + \beta\rho/I_0} \qquad (2)$$

which can be written $$F_1 \sim F_0 [1 - \tfrac{1}{2}(\beta\rho/I_0)] \qquad (3)$$

if $I_0$ is large with respect to the term $\beta\rho$.

It is apparent that as the density $\rho$ varies, the frequency response curve of the system can be assumed to be a straight line in a measurement interval in which $\rho$ has small values. The frequency meter 16 can be graduated directly in density for a given fluid.

In the case in which the material of the U-tube is not magnetizable itself, rings 14 and 14' made of a magnetic material can be slid over respective tube branches 4 and 3 and positioned in line with the coils 7, and 7'. It is also advantageous to position a biasing means in the form of permanent magnets 15, and 15' for example, at the ends of coils 7 and 7' respectively facing the U-tube.

In order to avoid any slip of the base frequency of the oscillating system due to a temperature variation, which would modify the coefficient of torsion K which appears in the expression for the frequency F, the invention also provides for the association of a second device, not shown, but identical to and thus having the same frequency $F_o$, as the device just been described. However, the fluid whose density is to be measured does not pass through this second device. The second device is disposed in the neighborhood of the first device so as to assume approximately the same temperature. Let $F_2$ be the frequency of oscillation for the second device. The frequency difference $(F_2 - F_o)$ is obtained by beating the two frequencies in a conventional mixing circuit which is followed by a low pass filter responsive to the difference frequency $(F_2 - F_o)$ and this frequency is measured by a frequency meter.

From the preceding expressions 1 and 2:

$$(F_2 - F_o) = \alpha \sqrt{K/I_o} \cdot \beta\rho/2I_o = F_o(\beta\rho/2I_o) \quad (4)$$

The quantity $(F_2 - F_o/F_o) = \beta\rho/2I_o$ is independent of temperature. The arrangement of the two devices giving the difference frequency $F_2 - F_o$ has a temperature coefficient that is small compared with that of the single oscillator device yielding $F_1$.

The invention is not limited to the single embodiment described by way of example; thus the drive coils can be disposed on the same side of the mid-plane of the U-tube member, for example, these coils then being supplied in phase opposition by means of a push-pull amplifier. Other means for establishing the torsional oscillation of the U-tube can also be provided, as for example, by means of electrostrictive elements mounted or glued on the U-tube member.

The invention is also applicable to the measurement of the density of gasses and of liquids.

What is claimed is:

1. A device for measuring the density of a fluid comprising:
    a base member;
    an elongated fluid conveying tube having a U-shaped end portion and a pair of leg portions extending therefrom for conveying said fluid, said leg portions being mounted on said base member;
    means in coupling relation to said U-shaped portion for establishing and maintaining an alternating torsional couple on said leg portions with respect to the median axis of said U-tube whereby vibrational movements are imparted thereto; and
    means coupled to said torsional oscillation means for measuring the frequency of said oscillation, the frequency being representative of the density of the fluid being conveyed through said tube.

2. A device according to claim 1 wherein said torsional oscillation means includes:
    a pair of drive coils located adjacent to said U-shaped portion such that the coil axes are perpendicular to the longitudinal axis of said U-tube;
    an amplifier; and
    vibration sensing means mounted on said base member and providing an output signal coupling to the input of said amplifier, the output of said amplifier being coupled to said pair of drive coils so as to cause said coils to maintain an alternating torsional couple with respect to the longitudinal axis of said U-tube.

3. A device according to claim 2 wherein said measuring means includes:
    a frequency meter the input of which is coupled to the output of said amplifier.

4. A device according to claim 3 and further including:
    a pair of magnetic ring members, each ring member being disposed around a respective leg portion of said U-tube and aligned with the axis of a respective one of said drive coils.

5. A device according to claim 4 and further including a permanent magnetic member disposed at the end of each drive coil and directed toward said U-tube.

6. Apparatus for measuring the density of a fluid comprising:
    two pair of base members;
    first and second tubular members, each comprising a U-shaped end portion having a pair of leg portions extending therefrom and mounted on a respective one of said base members, one of said tubular members providing for the passage of a fluid the density of which is to be measured;
    first and second amplifiers;
    two pairs of drive coils, each pair being positioned for operation in association with a respective pair of said leg portions, the outputs of said amplifiers being coupled to a respective one of said drive coil pairs, said coil pairs being spaced at equal distances from the base member securing the respective pair of leg portions so that each coil pair maintains an alternating torsional couple with respect to the median axis of the associated tubular member and imparts vibrational movements thereto;
    first and second vibration sensing means secured to a respective one of said base members, said sensing means each providing an output signal indicative of the frequency of oscillation of said respective tubular member for coupling to an input of a respective one of said first and second amplifiers;
    mixing means responsive to said first and second amplifier means for providing a signal corresponding to the difference in frequency of oscillation of said tubular members; and
    a frequency meter coupled to the output of said mixing means for providing a measurement of said difference frequency, said difference frequency being representative of the density of the fluid to be measured, each of said tubular member structures being arranged relative to one another such that they are under the influence of the same temperature conditions.

* * * * *